US011561798B2

(12) United States Patent
Barrick et al.

(10) Patent No.: US 11,561,798 B2
(45) Date of Patent: Jan. 24, 2023

(54) ON-THE-FLY ADJUSTMENT OF ISSUE-WRITE BACK LATENCY TO AVOID WRITE BACK COLLISIONS USING A RESULT BUFFER

(71) Applicant: INTERNATIONAL BUSINESS MACHINES CORPORATION, Armonk, NY (US)

(72) Inventors: Brian D. Barrick, Pflugerville, TX (US); Maarten J. Boersma, Holzgerlingen (DE); Niels Fricke, Herrenberg (DE); Dung Q. Nguyen, Austin, TX (US); Brian W. Thompto, Austin, TX (US); Andreas Wagner, Weil im Schönbuch (DE)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/943,525

(22) Filed: Jul. 30, 2020

(65) Prior Publication Data
US 2022/0035637 A1 Feb. 3, 2022

(51) Int. Cl.
*G06F 9/38* (2018.01)
*G06F 9/30* (2018.01)

(52) U.S. Cl.
CPC ........ *G06F 9/3857* (2013.01); *G06F 9/30101* (2013.01); *G06F 9/3814* (2013.01); *G06F 9/3867* (2013.01); *G06F 9/3873* (2013.01)

(58) Field of Classification Search
CPC ............................. G06F 9/3857; G06F 9/3873
See application file for complete search history.

(56) References Cited

U.S. PATENT DOCUMENTS

| 5,604,878 A | * | 2/1997 | Colwell | G06F 9/3836 710/6 |
| 5,778,245 A | | 7/1998 | Papworth | |
| 7,478,225 B1 | * | 1/2009 | Brooks | G06F 9/3836 712/214 |
| 8,560,813 B2 | | 10/2013 | Webber | |
| 9,336,003 B2 | | 5/2016 | Mylius | |
| 9,465,611 B2 | * | 10/2016 | Taunton | G06F 7/4806 |

(Continued)

OTHER PUBLICATIONS

Alipour et al., "Maximizing Limited Resources: a Limit-Based Study and Taxonomy of Out-of-Order Commit," Journal of Signal Processing Systems, 2019, 91(3-4), 379-397.

*Primary Examiner* — Jacob Petranek
(74) *Attorney, Agent, or Firm* — Donald J. O'Brien

(57) ABSTRACT

A system and method for avoiding write back collisions. The system receives a plurality of instructions at a pipeline queue. Next an issue queue determines a number of cycles for each instruction of the plurality of instructions. The issue queue further determines if a collision will occur between at least two of the instructions. Additionally, the system determines in response to a collision between at least two of the instructions, a number of cycles to delay at least one of the at least two instructions. The instructions are then executed. The system then places the results of the instruction for instructions that had a calculated delay in a result buffer for the determined number of cycles of delay. After the determined number of cycles of delay, the system sends the results to a results mux. Once received at the results mux the results are written back to the register file.

20 Claims, 4 Drawing Sheets

(56) References Cited

U.S. PATENT DOCUMENTS

| | | | |
|---|---|---|---|
| 9,665,372 B2 | 5/2017 | Eisen | |
| 9,977,678 B2 | 5/2018 | Eisen | |
| 2005/0091475 A1* | 4/2005 | Sodani | G06F 9/384 |
| | | | 712/217 |
| 2006/0095731 A1* | 5/2006 | Bustan | G06F 9/3824 |
| | | | 712/217 |
| 2019/0370004 A1* | 12/2019 | Airaud | G06F 9/3873 |
| 2019/0377577 A1 | 12/2019 | Park | |
| 2021/0389979 A1* | 12/2021 | Tran | G06F 9/3855 |

* cited by examiner

ON-THE-FLY ADJUSTMENT OF ISSUE-WRITE BACK LATENCY TO AVOID WRITE BACK COLLISIONS USING A RESULT BUFFER

BACKGROUND

The present disclosure relates to issue to write back management, and more particular aspects relate to adjusting issue to write back latency to avoid write back collisions.

In many systems to avoid write back collisions developers have had to install stalling mechanisms to slow the flow of the results of the execution of the write back to the registry. These stalling mechanisms have a negative impact on the performance of the underlying systems as the stalling mechanisms prevent use of processing resources.

SUMMARY

According to embodiments of the present disclosure, a system and a method for avoiding write back collisions is disclosed. The system receives a plurality of instructions at a pipeline queue. Next an issue queue determines a number of cycles for each instruction of the plurality of instructions. The issue queue further determines if a collision will occur between at least two of the instructions. Additionally, the system determines in response to a collision between at least two of the instructions, a number of cycles to delay at least one of the at least two instructions. The instructions are then executed. The system then places the results of the instruction for instructions that had a calculated delay in a result buffer for the determined number of cycles of delay. After the determined number of cycles of delay, the system sends the results to a results mux. Once received at the results mux the results are written back to the register file.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
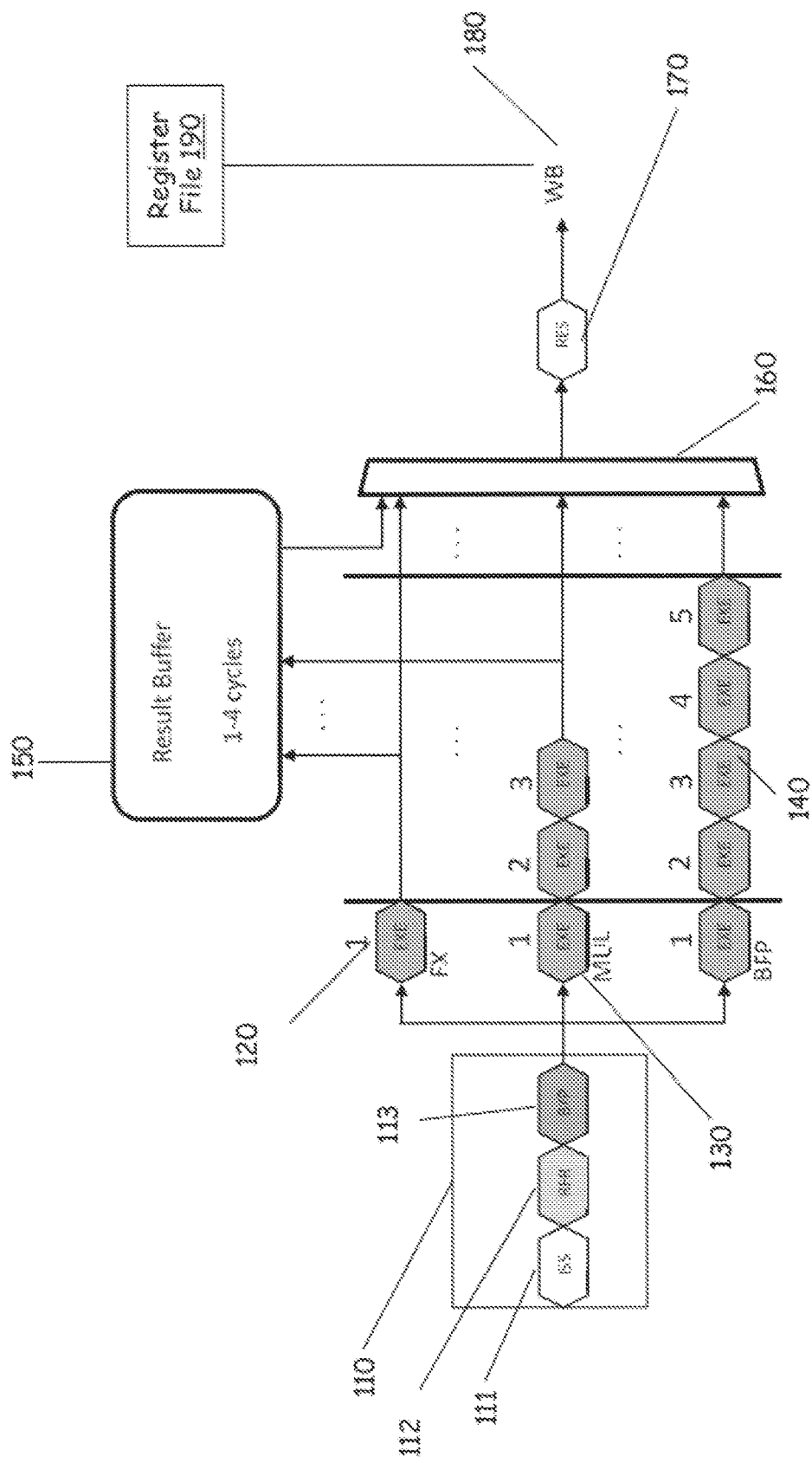
FIG. 1 is a diagrammatic illustration of a processing system including a result buffer to prevent write back collisions according to illustrative embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to issue to write back management, and more particular aspects relate to adjusting issue to write back latency to avoid write back collisions. While the present disclosure is not necessarily limited to such applications, various aspects of the disclosure may be appreciated through a discussion of various examples using this context.

FIG. 1 is a diagrammatic illustration of a computer system where the execution of threads utilizes several execution pipes to support various instructions for a given issue port. The computer system includes a pipeline queue 110, three execution pipes 120, 130, 140, a result buffer 150, a result mux 160, a result cycle 170, a write back port 180, and a register file 190.

FIG. 1 illustrates three execution pipes 120, 130, and 140. However, there can be any number of pipes present in the system. Each pipe is a path through which an instruction can be processed. In FIG. 1 there are three different types of instructions illustrated, a Fixed point (FX) using 1 execute cycle, a Multiply (MUL) pipe taking 3 execute cycles and a Binary Floating Point (BFP) taking 5 execute cycles. However, any number of different types of instructions can be present. Further, multiple of the same type of instruction may be present. Also the number of execute cycles needed to perform a particular type of instructions can vary. For example, a cryptological instruction pipeline may take 10 or more execute cycles.

In current systems when an instruction is ready to issue, the issue queue 111 must check to see if the instruction will create a conflict in the Result (RES) cycle feeding to the Write Back (WB) to the register file. In some cases, this conflict can be detected early and allow a different instruction to be executed and if not, an issued instruction must be cancelled to avoid going far enough to cause a conflict in the result mux 160 feeding the RES cycle. This type of collision avoidance can waste issue cycle bandwidth by cancelling due to conflict and can also create lock-out cases where several longer latency instructions can block out older short latency instructions from issuing.

The pipeline queue 110 is a component of the system that manages the instructions as they go into the pipes for processing. The pipeline queue 110 includes an issue queue 111 that is configured to issue a specific instruction to the pipes. The pipeline queue 110 also includes a reading component 112 to read operands to the instructions from the register file, and a bypass 113 that bypasses the reading component when the operands to the instructions do not need to be pulled from the register file. The pipeline queue 110 is configured to track instructions that are already in the pipeline and determine which of the pipes a particular instruction should be placed into. When it comes time to issue a particular instruction the issue queue 111 using the information about instructions already present in the pipes, detects a collision for the pipes that have shorter execution cycles. The issue queue 111 will determine the number of cycles to delay the instruction's results so that results will fit into an open cycle within the results mux feeding the results cycle 170. To achieve this the issue queue 111 has the ability to change the latency of any of the pipelines on the fly to fit the results into any open slots in execution feeding the result mux to the result cycle 170.

In the example illustrated in FIG. 1 the longest latency instruction is five execute cycles associated with the execution of BFP instruction that is illustrated at pipeline 140. The shortest latency instruction is one execute cycle associated with the execution of the FX instruction that is illustrated at pipeline 120. The latency of the MUL instructions is in between having a latency of three execute cycles illustrated at pipeline 130. While FIG. 1 illustrates latencies of between one and five execute cycles, it should be understood that the latency of a particular instruction could have any number of latency execute cycles. Based on this number of latency cycles, the issue queue 111 will indicate the number of cycles to delay the instruction. This information will be communicated to the executing unit of the system that will determine the number of cycles to place the instructions into the result buffer 150.

The issue queue 111 implements a tracking logic to determine the number of cycles that a particular instruction should be delayed in the result buffer 150. The issue queue 111 uses a tracking pipeline from issue to RES to indicate where the previously issued instruction are in the execution pipeline in order to schedule the next instruction and avoid writeback collision.

RES-7->RES-6->RES-5->RES-4->RES-3->RES-2->RES-1->RES

The natural flow for each of the 3 types in this example of executions would be for the BFP issue to enter the pipe at RES-7 and pipe down to RES. The MUL issues would enter to at RES-5 and pipe down to RES. The FX issue would enter at RES-3 and pipe down to the RES. The issue queue 111 first checks to see if the natural pipe is available. If available, then the issue queue 111 determines that no delay is needed. If the particular pipe stage is occupied, the issue queue 111 checks up the stack to find a slot which is not occupied. Once an open slot is found the issue queue 111 determines a delay for that instruction based upon the number of stages the queue had to go back to find an empty slot. For example, if a MUL issue is followed 2 cycles later by a FX issue. The FX issue would find RES-4 taken by the MUL and thus cannot flow naturally. The logic then checks RES-5 and sees it is empty but will enter at RES-4 instead and will mark the instruction as requiring 1 cycle delay.

Figure 2:
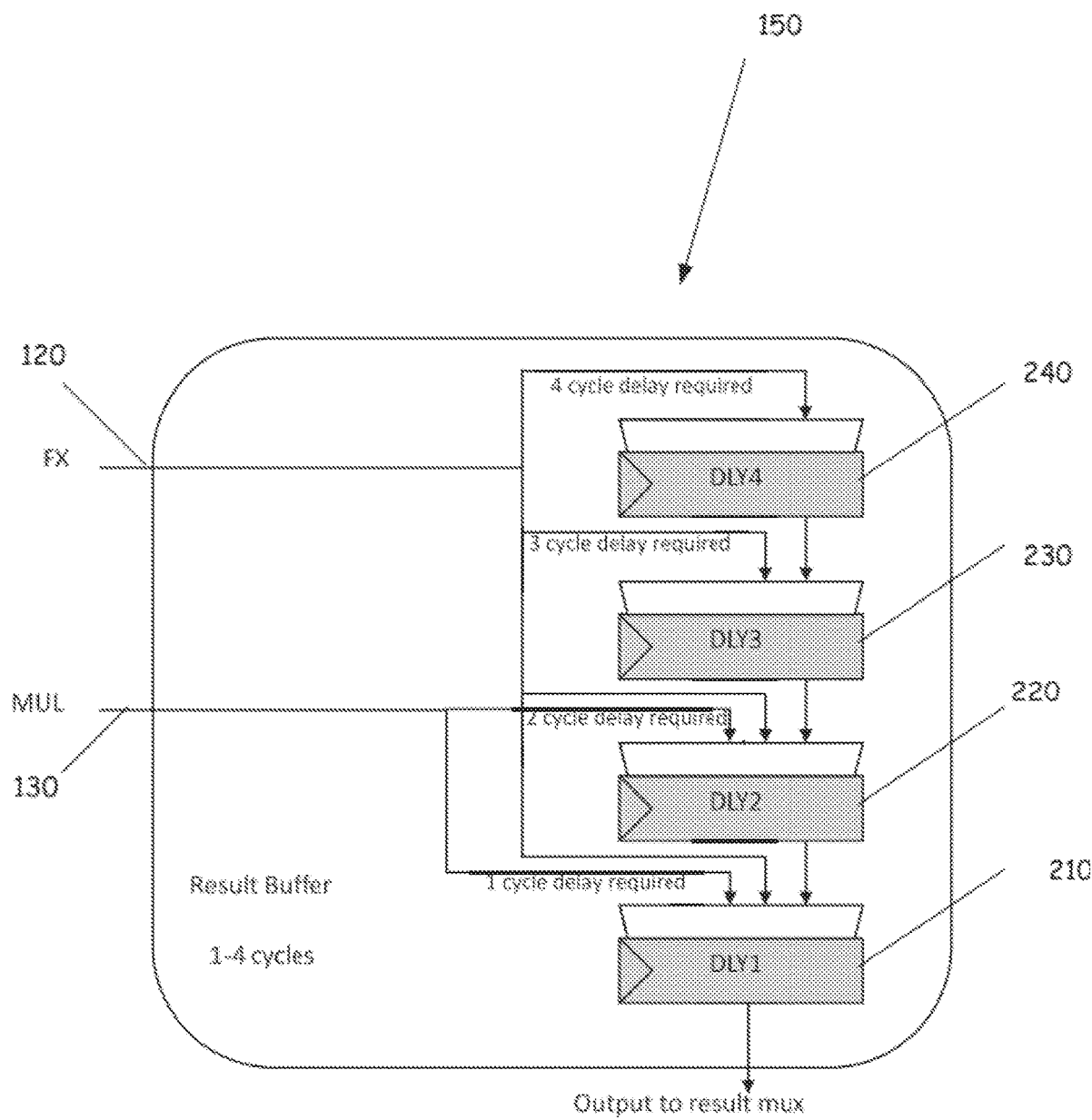
FIG. 2 is a diagrammatic illustration of the result buffer according to illustrative embodiments.

The result buffer 150 is a component of the system that delays the results of the instructions before the results are sent to result mux, result cycle 170, and the write back port 180 to write back to the register file 190. Based on the delay number of cycles determined by the issue queue 111 the results enter into the result buffer 150 at a different point to provide the determined delay. FIG. 2 is a diagrammatic illustrating the structure of the result buffer 150 according to embodiments. In this embodiment, the result buffer 150 has the capability of delaying up to four execute cycles. However, any number of delay cycles can be present in the result buffer 150. When there are additional delay cycles the structure and execution of the result buffer 150 operates in a similar manner.

In FIG. 2 there are four delay cycle functions, 210, 220, 230, and 240. The pipelines 120, 130 are configured to feed into the each of the delay cycles of the result buffer 150 based upon the determined number of delay cycles for the instructions. In the embodiment illustrated in FIG. 2 the FX result may be determined to need up to a four cycle delay. Therefore, when the execution of the FX instruction in the pipeline 120, the results are then fed to the result buffer 150 at the appropriate delay point. In the case of four cycle delay, the results are placed into the result buffer 150 at delay point 240, which represents a four cycle delay. If the delay had been determined to be three delay cycles, the results would have been placed in the result buffer 150 at delay point 230, which represents a three cycle delay. In this example, the MUL instruction was determined to need up to a two cycle delay. If marked as two cycle required, following the completion of MUL instruction in pipeline 130, the results of the execution are fed into the result buffer 150 at delay point 220 which represents a two cycle delay. If the delay had been determined to be one cycle, then the results would have been placed in the result buffer at delay point 210, which represents a one cycle delay.

During operation the result buffer 150 would move each result down one level upon the completion of each execute cycle of the system. That is a result that is placed into the result buffer a delay point 240 would move to delay point 230 upon the completion of the execute cycle. Likewise a result at delay point 220 would move to delay point 210 upon completion of the execute cycle. When a result reaches delay point 210 following the completion of the execute cycle would output the results to the result mux 160 for writing the results back to the register file 190 through the write back port 180. During the operation of the result buffer 150, if the results were to move to the next lower delay point, but an intervening result was placed in that delay point the results would not move to the next delay point. For example, if a result was in delay point 230 and a new result was placed into delay point 230, the results would not move from delay point 230 to delay point 220, until such time as the results are able to move forward in the delay points.

The result mux is a component of the system that takes the results from the various pipes and feeds them to the write back port 180 for writing the results to back to the register file 190. As some of the instructions have been placed into the result buffer 150, the results mux also receives the results from the instructions from the result buffer 150.

Figure 3:
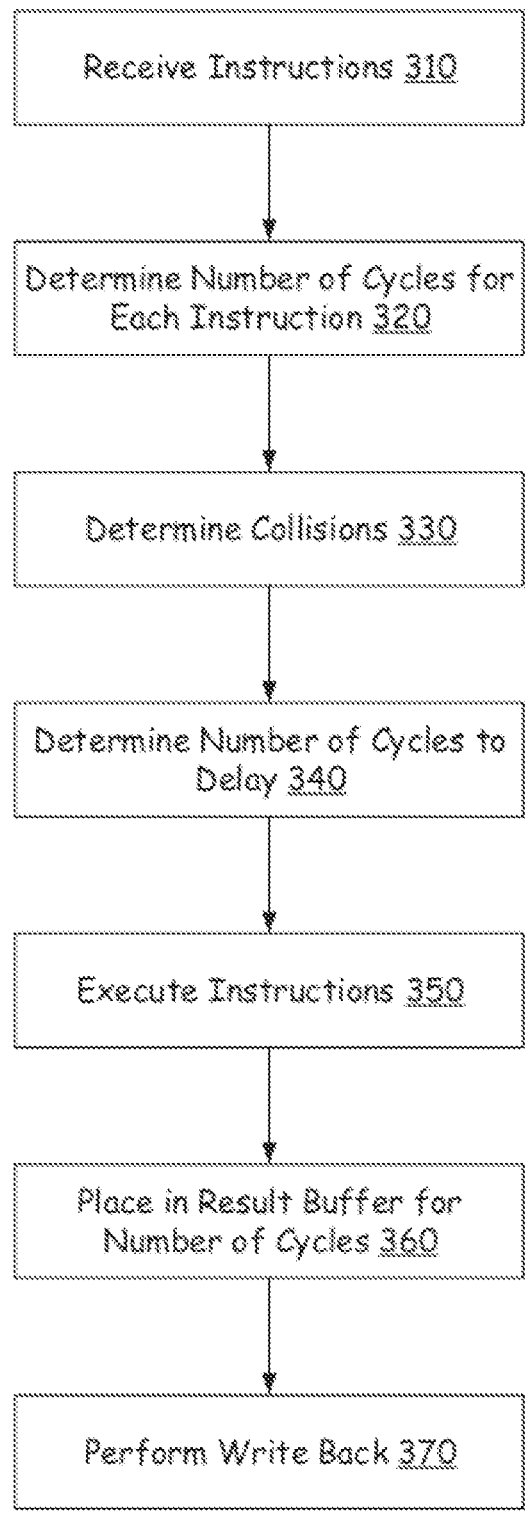
FIG. 3 is a flow diagram illustrating a process of using the result buffer according to illustrative embodiments.

FIG. 3 is a flow diagram illustrating the process of using the result buffer 150 to delay instructions to avoid a write back collision. The process begins when the issue queue 111 receives instructions to execute. This is illustrated at step 310. The issue queue 111 then determines a number of cycles needed for the instruction to complete the RES cycle. This is illustrated at step 320.

The issue queue 111 then determines if a collision will occur between two instructions during write back. This is illustrated at step 330. The issue queue 111 implements a tracking logic to determine the number of cycles that a particular instruction should be delayed in the result buffer 150. The issue queue 111 uses a tracking pipeline from issue to RES to indicate where the issued instruction is in the execution pipeline in order to schedule the next instruction and avoid writeback collision The issue queue 111 first checks to see if the natural pipe is available for the instructions. If available, then the issue queue 111 determines that no collision will occur. If the natural pipe is not available the issue queue 111 determines that a collision will occur.

When the issue queue 111 determines that a collision will occur, it then determines the amount of delay required to avoid the collision. This is illustrated at step 340. When a collision is present, the issue queue 111 examines the tracking pipeline to find a slot which is not occupied. Once an open slot is found the issue queue 111 determines a delay for that instruction based upon the number of stages the queue had to go back to find an empty slot.

The instruction is then allowed to issue and execute. This is illustrated at step 350. Following the completion of the instruction, the results are placed in the result buffer 150 for the determined number of delay cycles indicated by the issue queue 111. This is illustrated at step 360. As each cycle of the system occurs the instructions move through the delay cycle functions in the result buffer 150 until reaching the end of the result buffer 150. Upon reaching the end of the result buffer 150 the results of that instruction are then given to the result cycle to perform the write back to the register file 190. This is illustrated at step 370.

Figure 4:
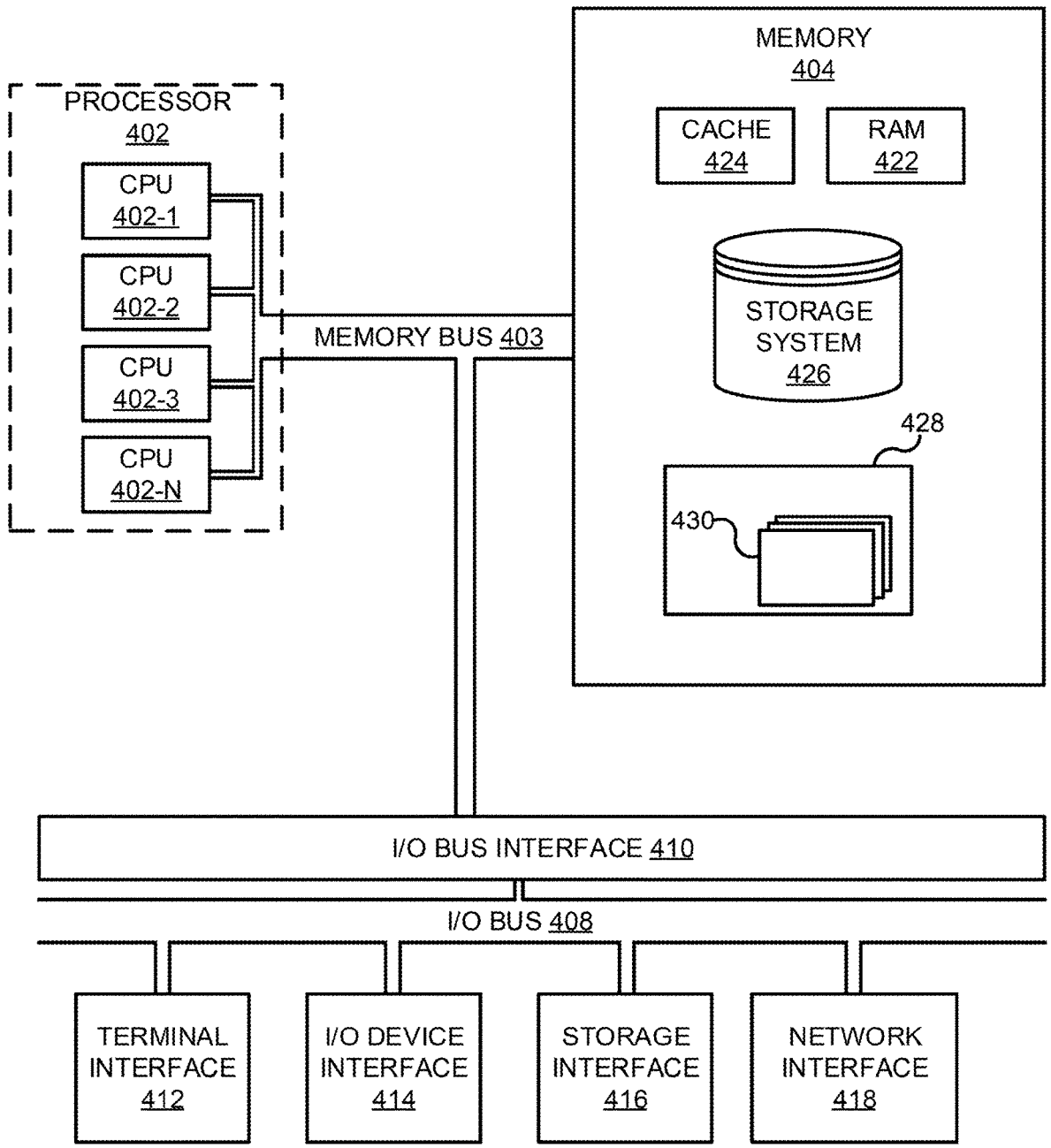
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, 402-N, herein collectively referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for avoiding write back collisions comprising:
   receiving a plurality of instructions at a pipeline queue, wherein the pipeline queue includes an issue queue, a reading component to read operands of the plurality of the instructions, and a bypass configure to bypass the operands around the reading component;
   determining, by the issue queue, a number of cycles for each instruction of the plurality of instructions;
   determining, by the issue queue, if a collision will occur between at least two of the instructions of the plurality of instructions;
   determining, in response to a determined collision between the at least two of the instructions of the plurality of instructions, a number of cycles to delay at least one instruction of the at least two instructions of the plurality of instructions;
   executing the plurality of instructions;
   for the at least one instruction for which a delay was determined, placing results of the at least one instruction in a result buffer for the determined number of cycles of delay;
   determining, during the determined number of cycle of delay, an intervening result occupies a delay cycle function in the result buffer the results would move forward into;
   delaying the results of the at least one instruction in the result buffer, for at least one cycle of delay;
   after the determined number of cycles of delay including the delay from the intervening result, sending the results to a results mux; and
   performing a write back process for the at least one instruction.

2. The method of claim 1 wherein the result buffer includes a plurality of delay functions.

3. The method of claim 2 wherein the results of the at least one instruction is placed in the result buffer at a delay function of the plurality of delay functions where the results of the at least one instruction must pass through a number of delay functions equal to the determined number of cycles of delay.

4. The method of claim 3 wherein following execution of a cycle, moving the results of the at least one instruction forward one delay function within the result buffer.

5. The method of claim 3 further comprising:
   determining a second number of cycles to delay a second instruction; and
   placing second results of the second instruction in the result buffer for the determined second number of cycles of delay.

6. The method of claim 5 wherein following execution of a cycle, moving the results and the second results forward one delay function within the result buffer.

7. The method of claim 6 wherein the second results are placed into the result buffer prior to moving the results of the at least one instruction forward within the result buffer.

8. The method of claim 7 wherein when a delay function to which the results of the at least one instruction would move forward into is occupied by the second results, not moving the results of the at least one instruction forward one delay function.

9. The method of claim 1 further comprising:
   determining if a natural pipe having a natural flow is available for the plurality of instructions; and
   in response to the natural pipe being available, implementing no delay for the plurality of instructions.

10. A system for avoiding a write back collision in a register file, comprising:
    a pipeline queue configured to manage a plurality of instructions processed through at least two pipe, wherein the pipeline queue includes an issue queue, a reading component to read operands of the plurality of the instructions, and a bypass configure to bypass the operands around the reading component;
    a result buffer, separate from the at least two pipes, configured to delay processing of results for at least one of the plurality of instructions, wherein the results buffer includes delay cycle functions configured to delay the results in the result buffer as well as apply additional delay to the results when intervening results are placed in the result buffer; and
    a write back port to write back results of the plurality of instructions to the register file, wherein the write back port is configured to receive results for the at least one of the plurality of instructions and results from the at least two pipes.

11. The system of claim 10 wherein the
    the issue queue is configured to:
    determine a number of cycles for each instruction of the plurality of instructions;
    determine if a collision will occur between at least two of the instructions of the plurality of instructions; and
    determine in response to a determined collision between at least two of the instructions of the plurality of instructions, a number of cycles to delay at least one of the at least two of the instructions.

12. The system of claim 10 wherein the result buffer includes a plurality of delay points.

13. The system of claim 12 wherein a result in the result buffer moves from a first delay point to a second delay point following execution of a cycle by the system.

14. The system of claim 13 wherein the result buffer does not move results from the first delay point to the second delay point when the second delay point already includes a newly placed result from the first delay point.

15. The system of claim 12 wherein the results placed into the result buffer are placed at a delay point of the plurality of delay points such that a number of delay points in front of the results is equal to a calculated number of cycles of delay determined to avoid a write back collision.

16. A computer readable storage medium configured for avoiding write back collisions having computer executable instructions that when executed cause a computing system to perform a method of:
    receiving a plurality of instructions at a pipeline queue, wherein the pipeline queue includes an issue queue, a reading component to read operands of the plurality of the instructions, and a bypass configure to bypass the operands around the reading component;
    determining, by the issue queue, a number of cycles for each instruction of the plurality of instructions;
    determining, by the issue queue, if a collision will occur between at least two of the instructions of the plurality of instructions;
    determining, in response to a determined collision between the at least two of the instructions of the plurality of instructions, a number of cycles to delay at least one instruction of the at least two instructions of the plurality of instructions;
    executing the plurality of instructions;
    for the at least one instruction for which a delay was determined, placing results of the at least one instruction in a result buffer for the determined number of cycles of delay;
    determining, during the determined number of cycle of delay, an intervening result occupies a delay cycle function in the result buffer the results would move forward into;
    delaying the results of the at least one instruction in the result buffer, for at least one cycle of delay;
    after the determined number of cycles of delay including the delay from the intervening result, sending the results to a results mux; and
    performing a write back process for the at least one instruction.

17. The computer readable storage medium of claim 16 wherein the result buffer includes a plurality of delay functions.

18. The computer readable storage medium of claim 17 wherein the results of the at least one instruction is placed in the result buffer at a delay function of the plurality of delay functions where a number of delay functions the results of the at least one instruction must pass through is equal to the determined number of cycles of delay.

19. The computer readable storage medium of claim 18 wherein following execution of a cycle, moving the results of the at least one instruction forward one delay function within the result buffer.

20. The computer readable storage medium of claim 17 further comprising:
    determining a number of cycles to delay a second instruction; and
    placing second results of the second instruction in the result buffer for the determined number of cycles of delay.

* * * * *